United States Patent
Palenius et al.

(10) Patent No.: US 7,917,113 B2
(45) Date of Patent: Mar. 29, 2011

(54) METHOD FOR SYNCHRONIZATION IN A MOBILE RADIO TERMINAL

(75) Inventors: Torgny Palenius, Barsebäck (SE);
Johan Hokfelt, Lund (SE); Christer Östberg, Staffanstorp (SE); Jan Wichert, Malmö (SE); Mikael Nilsson, Lund (SE); Richard Ewald, Lund (SE); Patrik Olofsson, Höllviken (SE); Håkan Palm, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 397 days.

(21) Appl. No.: 10/553,082

(22) PCT Filed: Apr. 5, 2004

(86) PCT No.: PCT/EP2004/003582
§ 371 (c)(1),
(2), (4) Date: Sep. 1, 2006

(87) PCT Pub. No.: WO2004/091231
PCT Pub. Date: Oct. 21, 2004

(65) Prior Publication Data
US 2007/0037594 A1    Feb. 15, 2007

Related U.S. Application Data

(60) Provisional application No. 60/462,004, filed on Apr. 11, 2003.

(30) Foreign Application Priority Data

Apr. 11, 2003   (EP) .................................. 03008440

(51) Int. Cl.
*H04W 56/00*    (2009.01)
*H04W 72/00*    (2009.01)
*H04W 72/12*    (2009.01)

(52) U.S. Cl. .............. 455/208; 370/324; 370/395.62; 370/503; 455/502

(58) Field of Classification Search ................. 455/552
See application file for complete search history.

(56) References Cited

U.S. PATENT DOCUMENTS

| | | | |
|---|---|---|---|
| 5,479,409 A * | 12/1995 | Dupuy et al. | 370/337 |
| 5,761,623 A * | 6/1998 | Lupien et al. | 455/552.1 |
| 6,370,356 B2 * | 4/2002 | Duplessis et al. | 455/63.3 |
| 6,959,201 B2 * | 10/2005 | Leprieur et al. | 455/552.1 |
| 7,206,601 B2 * | 4/2007 | Mukai et al. | 455/552.1 |
| 7,248,889 B2 * | 7/2007 | Schwarz et al. | 455/522 |
| 2002/0098864 A1 * | 7/2002 | Mukai et al. | 455/552 |
| 2003/0003951 A1 * | 1/2003 | Leprieur et al. | 455/552 |
| 2003/0224819 A1 * | 12/2003 | Sanchez | 455/552.1 |
| 2004/0110479 A1 * | 6/2004 | Ormson et al. | 455/208 |
| 2004/0185899 A1 * | 9/2004 | Hayem et al. | 455/552.1 |
| 2004/0203965 A1 * | 10/2004 | Robinson | 455/502 |

FOREIGN PATENT DOCUMENTS

| | | | |
|---|---|---|---|
| EP | 0996301 A1 | | 3/1999 |
| EP | 1 030 477 A | | 8/2000 |
| WO | WO 00/04729 | * | 1/2000 |
| WO | WO 02/39758 A | | 5/2002 |
| WO | WO 03/021426 A2 | | 3/2003 |

* cited by examiner

*Primary Examiner* — Nick Corsaro
*Assistant Examiner* — Frank Donado

(57) ABSTRACT

A method for synchronizing measurements in a mobile communication apparatus having a first active radio access means (100) adapted to communicate according to a first radio access technology (RAT) and at least a second passive radio access means (200) adapted to communicate according to a second RAT. A time reference common to the first and the second access means (100) is generated. At least one time schedule is obtained, said schedule indicating at least one time gap wherein the second access means (200) is allowed to be active. The activation time of the schedule is based on the common time reference. An arrangement adapted to generate the common time reference and the time schedule is also disclosed.

30 Claims, 7 Drawing Sheets

METHOD FOR SYNCHRONIZATION IN A MOBILE RADIO TERMINAL

This application claims the benefit of U.S. Provisional Application No. 60/462,004, filed Apr. 11, 2003, the disclosure of which is fully incorporated herein by reference.

TECHNICAL FIELD OF THE INVENTION

The present invention relates to a method for a mobile radio terminal having dual radio access technology (RAT) capabilities, and more specifically to a method for providing a common time event, from which the start time of measurements required according to respective RAT is determined, and a communication apparatus having such synchronization capabilities.

DESCRIPTION OF RELATED ART

Different telecommunication systems using different technologies are available. GSM (Global System for Mobile communications) considered as a second-generation communication system is one of the most common and is based on TDMA (Time Division Multiple Access) radio access technology (RAT). GPRS (General Packet Radio Service) and EDGE (Enhanced Data for GSM Evolution) are data communication techniques for GSM systems, which are also based on TDMA technology. UMTS (Universal Mobile Telecommunication System) is considered a third-generation communication system and is based on WCDMA (Wideband Code Division Multiple Access) RAT. The WCDMA technology may be used as a stand-alone RAT. 3GPP (third Generation Partnership Project) specifications suggests a dual RAT communication system, which shall allow mobile terminals to handle both WCDMA and a second RAT, such as GSM. An important feature in dual RAT systems is the possibility to do handover between RATs and to select cell in the RAT that has the best radio environment quality. In order to achieve this, a dual RAT mobile terminal needs to execute cell measurements on both RAT systems in addition to receive/transmit using one of the RATs. When the terminal is connected to one system being active, measurements on the passive system have to be supported. This is a problem in case the passive system can not carry out measurements while the active system is receiving/transmitting. Simultaneous activities of the systems are problematic when the systems utilize common radio resources, such as a common antenna. Furthermore, simultaneous activities may also be problematic when two parallel RAT systems having separate radio resources are provided. A first of the parallel systems may interfere with the second RAT system to such an extent that the second RAT system is unable to provide measurements. In both these cases, the measurements on the passive system could be carried out when there are gaps in the reception/transmission of the active system. The occasions that can be utilized by the passive system are either determined by the active system or given by the radio access network of the active system.

There is a problem with providing measurements in a passive or slave system when it may not be active simultaneously with the active system, as the time gaps when the active system is not receiving/transmitting are very short. The passive system has to execute its measurements during such gaps. Furthermore, the two systems are not synchronized and may not use the same time format. Different time formats cause further problems, as is the case for GSM/GPRS/EDGE and WCDMA. According to GSM requirements, cell measurements have to be provided during pre-specified occasions that are determined in the GSM time format. It is not required that the cell measurements according to WCDMA RAT are executed during a specific time. WCDMA cell measurements may be executed at practically any time and do not have to be planned in advance, as is the case for GSM measurements. The time formats of GSM and WCDMA are different. Therefore, the WCDMA system cannot simply indicate in its own time format to the GSM system when the GSM system is allowed to be active and provide cell measurements, as the GSM system is not capable of interpreting the given gaps.

SUMMARY OF THE INVENTION

One object of the present invention is to provide a method for providing a time schedule for cell measurements on an active radio access network utilizing a first radio access technology (RAT) and on a passive radio access network utilizing a second RAT, for facilitating e.g. handover and cell selection when the access means may not transmit/receive simultaneously.

According to a first aspect of the invention, this object is achieved by a method providing synchronization of the time used for cell measurements of a first communication network executed by a first radio access means and the time used for cell measurements of a second network executed by a second radio access means. The first access means utilizes a first RAT, such as WCDMA, whereas the second access means utilizes a second RAT, such as GSM. The first and the second access means may have one radio resource in common, which requires that the first and the second access means are not active simultaneously. Alternatively, the first and second access means have no radio resource in common, but are not allowed to transmit/receive simultaneously. According to the invention, the first access means is normally active and facilitates both communication and measurements, whereas the second access means acts as a slave access means, which only provides cell measurements until handover is made. According to the invention, a time reference common to the first and the second access means is generated. A time schedule common to the first and second access means is obtained, which indicates at least one time gap wherein the first access means is not receiving/transmitting and wherein the second access means is allowed to be active (receive/transmit). The schedule is determined based on the common time reference.

The common time reference may be generated in response to a time event (CTE) common to the first and second access means. In response to said CTE, the values of counters of the first and second access means, respectively, will be stored in counter value registers connected to the counters. The values of the registers will serve as the values of the time reference, which are expressed in the time format of the respective RAT.

The first access means will determine a measurement gap schedule (MGS) comprising a time schedule defining the duration and location of the gaps with respect to the CTE. The second access means is allowed to be active during said gaps. The MGS will comprise an activation time of the schedule, which is determined in the time format of the first access means and which may be determined based on the time distance from the CTE. When the second access means receives the MGS it may translate it and use the time reference of its registers to determine the activation time in its own time format.

Another object of the invention is to provide an arrangement adapted to provide cell measurements on an active radio access network utilizing a first radio access technology (RAT) and measurements on a passive radio access network utilizing a second RAT.

According to a second aspect of the invention, this object is achieved by an arrangement comprising a first radio access means and a second radio access means. The first access means is adapted to communicate with a first communication network according to a first RAT, whereas the second access means is adapted to communicate with a second communication network according to a second RAT. The arrangement further comprises a time reference generating means for generating a time reference common to the first and the second access means. A time schedule generating means for obtaining at least one time schedule being common to the first and second access means is adapted to generate a time schedule, which indicates at least one time gap wherein the first access means is not receiving/transmitting and wherein the second access means is allowed to be active. The time schedule generating means is further adapted to determine an activation time of the schedule, which is determined based on the time distance to the common time reference.

The first and second access means may have at least one common radio resource, such as an antenna.

The arrangement may further comprise in each access means a counter for generating counter values, a counter value register for registering counter values, and a counter synchronize mechanism. Either of the mechanisms may be adapted to generate a CTE, in response to which the counter values will be registered in the respective registers. The counter values are expressed in the time format of the respective access means.

The time schedule generating means may further be adapted to incorporate into the time schedule parameters identifying the time gaps, wherein the second access means is allowed to be active, and the activation time of the schedule. The second access means is adapted to translate the MGS to its own time format and determine the activation time by means of the counter values stored in its register.

According to a third aspect of the invention, a computer program product directly loadable into a memory of a mobile terminal having computer capabilities, such as a central processing unit for executing computer software code portions is disclosed. The product comprises software code portions for performing the method according to the invention when said product is run by said terminal.

According to a fourth aspect of the invention, the inventive arrangement is used in a wireless communication apparatus. The apparatus may be a mobile radio terminal, a mobile telephone, a pager, or a communicator, i.e. a personal digital assistant or a smartphone.

One advantage of the invention is that it gives a robust method that can be applied in all different states to transfer occasions for measurements from the active radio access means to the passive access means.

Further embodiments of the invention are defined in the dependent claims.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Further objects, features, and advantages of the invention will appear from the following description of several embodiments of the invention, wherein various aspects of the invention will be described in more detail with reference to the accompanying drawings, in which.

DETAILED DESCRIPTION OF EMBODIMENTS

Figure 1:
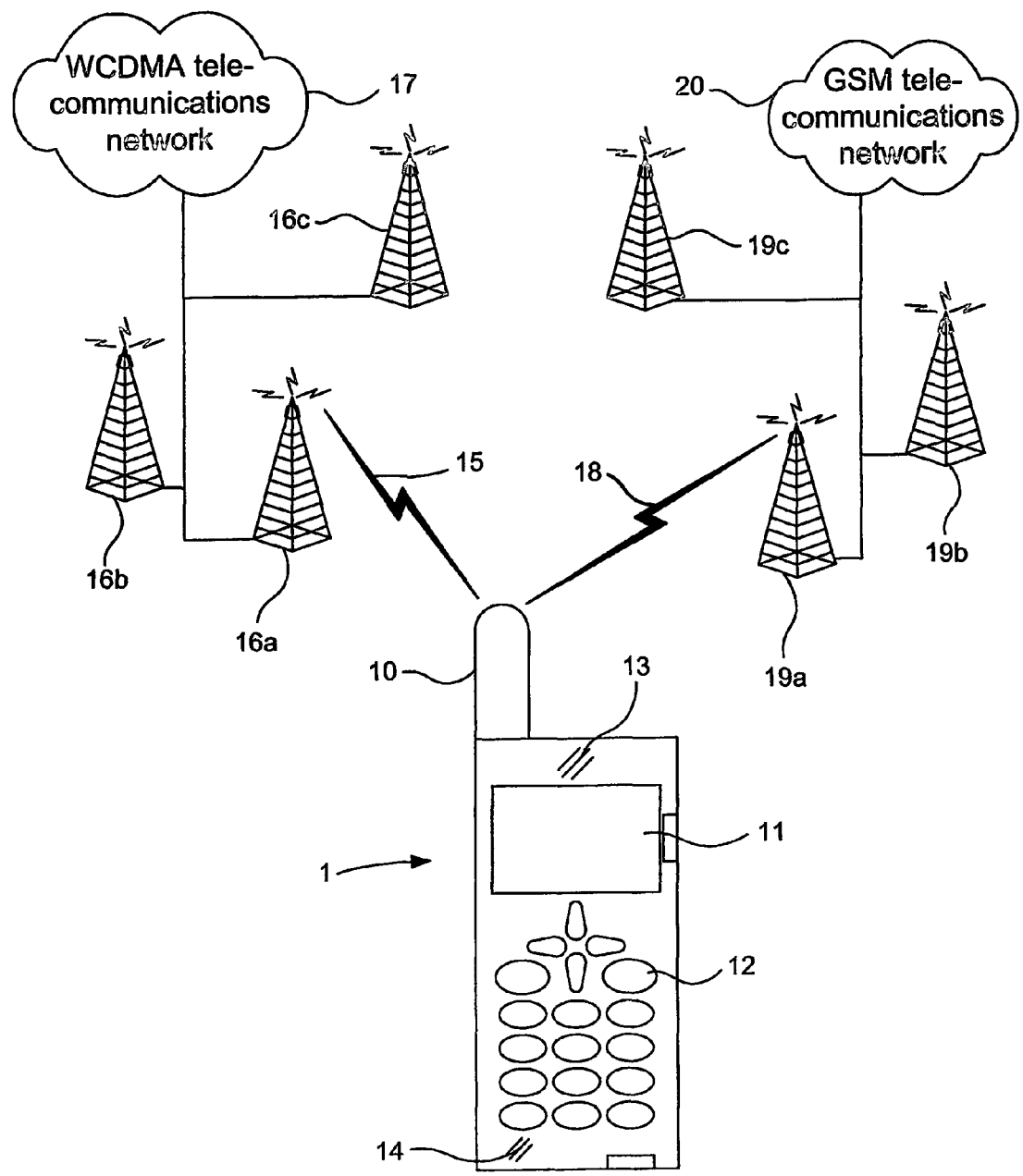
FIG. 1 is a schematic front view of a mobile telephone and the environment in which it operates.

FIG. 1 illustrates a mobile telephone 1 as a schematic front view and the environment in which it operates. The mobile telephone 1 comprises an antenna 10 mounted on the housing of the apparatus. Alternatively, the mobile telephone 1 may have an internal antenna mounted within the housing of the apparatus. The antenna 10 is electrically connected to a printed circuit board of the mobile telephone 1 through an antenna switch, as will be further described below. The mobile telephone further comprises a display 11, a keypad 12, a loudspeaker 13, and a microphone 14, which together provide a man-machine interface for operating the mobile telephone 1.

The mobile telephone 1 may alternatively have two separate internal or external antennas (se FIG. 2b) antennas, which are adapted to the radio access technology for which they are utilized, as will be discussed below.

The mobile telephone 1 is adapted to establish a first wireless link 15 to a radio station (base station) 16a of a first mobile telecommunication network 17. The mobile telephone 1 is also adapted to establish a second wireless link 18 to a radio station (base station) 19a of a second mobile telecommunication network 20. Each base station 16a, 19a serves one or several cells. The first system 17 utilizes a first radio access technology (RAT), such as WCDMA (Wideband Code Division Multiple Access) or cdma2000 (Code Division Multiple Access 2000), for communicating with the mobile telephone 1. The second system 20 utilizes a second radio access technology (RAT) other than the first RAT for communicating with the mobile telephone, such as GSM (Global System for Mobile communications).

The mobile telephone 1 is further adapted to select whether to utilize the first or the second communication network 17, 20 for providing communication of e.g. speech and data depending on the quality of the link 15, 18 between the base stations 16a, 19a and the mobile terminal 1. Thus, the mobile telephone has to provide cell measurements of neighboring cells. As is illustrated in FIG. 1, the first and the second network comprise several base stations 16b, 16c, and 19b, 19c, respectively, each serving one or several cells. As the position of the mobile telephone may change it may come into the vicinity of another cell, in which better link quality is provided compared to the one in which the mobile telephone 1 is located. Either the first or the second network 17, 20 is the active network, whereas the other is the passive or the slave system. When the mobile telephone 1 experiences superior link quality from a base station 16*a-c*, 19*a-c*, serving a specific cell not belonging to the active network 17, 20, the network may do handover to the other network. Also, the mobile may provide cell selection between neighboring cells within the same network. Handover and cell selection require that the mobile telephone provides cell measurements of both the active and the passive network, 17, 20.

The present invention provides a method for synchronizing the cell measurements of the active and the passive network when said networks are not utilizing the same time format. In WCDMA, frame, slot and chip are used as the time format, whereas the time format of GSM is multiframe and quarter bit.

The mobile telephone 1 may utilize common radio resources for communication according to the first and the second RAT. Thus, the antenna 10 is adapted to communicate signals in a first frequency band when the first network 17 is active and communicate signals in a second frequency band when the second network 20 is active. Communication using the WCDMA RAT is provided in the 2 GHz frequency range, whereas communication using the GSM RAT is provided in the 900, 1800, and/or 1900 frequency ranges.

Figure 2A:
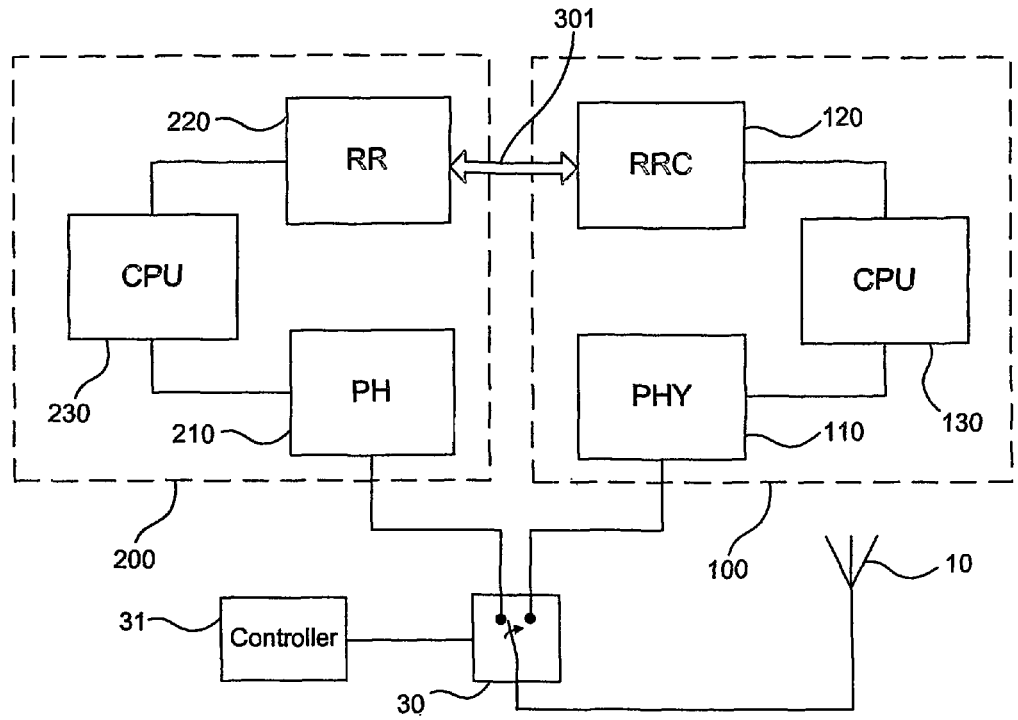
FIG. 2a is a block diagram of access means for a first and a second radio access technology having common radio resources.

As can be seen in FIG. 2*a*, the antenna 10 is connected to an antenna switch 30 for connection to either access means 100 of the first RAT or access means 200 of the second RAT, which may be provided as ASIC's (Application Specific Integrated Circuit) on separate chips. The switch 30 is controlled by a controller 31, which may be provided as an integrated circuit integral with the switch 30, or by any central processing unit (CPU) of the mobile telephone 1, as will be discussed below.

Figure 2B:
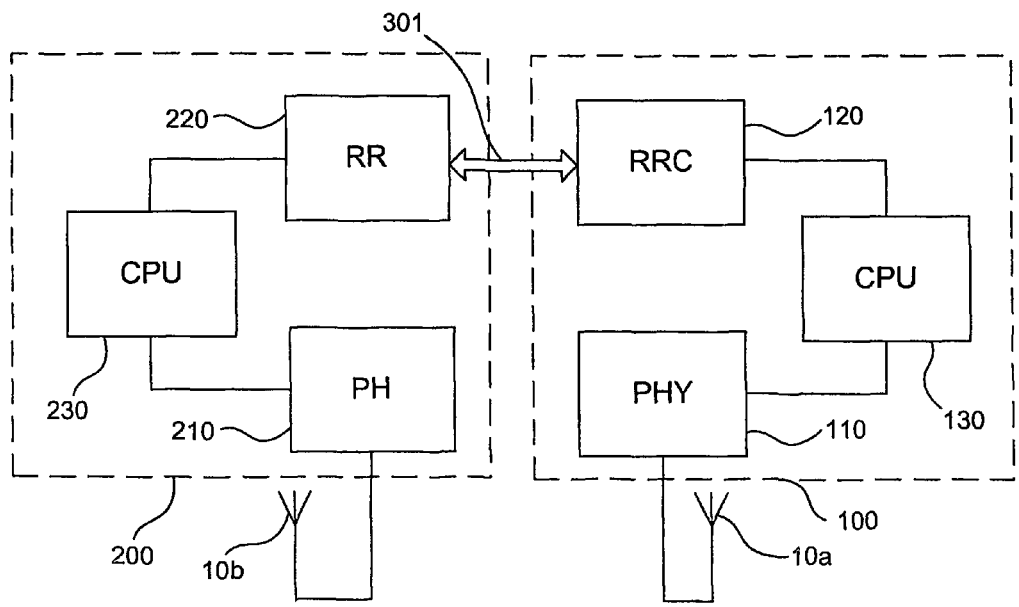
FIG. 2b is a block diagram of access means for a first and a second radio access technology having separate antennas.

Alternatively, each access means 100, 200 has its own antenna, as can be seen in FIG. 2*b*. Corresponding components of FIGS. 2*a* and 2*b* are denoted with the same reference numerals. In the embodiment of FIG. 2*b*, the first access means 100 is connected to a first antenna 10*a*, which is adapted to provide signals in at least a first frequency band, such as in the WCDMA frequency band. The second access means 200 is connected to a second antenna 10*b*, which is adapted to provide signals in at least a second frequency band, such as a GSM frequency band.

The access means 100, 200, comprise circuitry for communicating according to their respective technologies. Each access means 100, 200 comprises an air interface stack having a physical layer implemented using hardware, and higher layer implemented with software for controlling the communication. The access means is generally known in the art and is therefore not further disclosed here, except when the invention departs from what is generally known.

For convenience, in the following the access means 100 adapted according to WCDMA RAT will be denoted WCDMA RAT 100 and the access means 200 adapted according to GSM RAT will be denoted GSM RAT 200. However, this should not be taken as limiting the scope of the invention, but is only for exemplifying purposes. The first communication may alternatively be a cdma2000 network and the second network may alternatively be a PCS network.

The switch 30 is in a first position operatively connected to a physical layer 110 of the air interface access stack of the WCDMA RAT 100. The WCDMA physical layer 110 is controlled by a radio resource controller (RRC) block 120, which may also control the switch 30. The RRC block 120 may establish and terminate a connection to the WCDMA system, as well as initiating cell measurements required according to system requirements and do handover. In a second position, the switch is operatively connected to the physical layer 210 of the air interface access stack of the GSM RAT 200. The GSM physical layer 210 is controlled by a management physical layer or radio resource (RR) block 220. The RR block 220 may establish and terminate a connection to the GSM system, as well as initiating cell measurements required according to system requirements and do handover. The RR block 220 may control the switch 30 instead of the RRC block 120. The circuits of the physical layer of the respective RAT's are connected via a first connection 300 (see FIG. 3) for purposes that will be described below. Also, a second connection 301 is provided between the higher layers (layer 2 and layer 3) of the access stacks of the respective RATs 100, 200, for providing high level communication, as will be further described below. Each RAT 100, 200 comprises a central processing unit 130, 230 for executing the functionality of the software that implements the higher layers of the access stacks.

Figure 3:
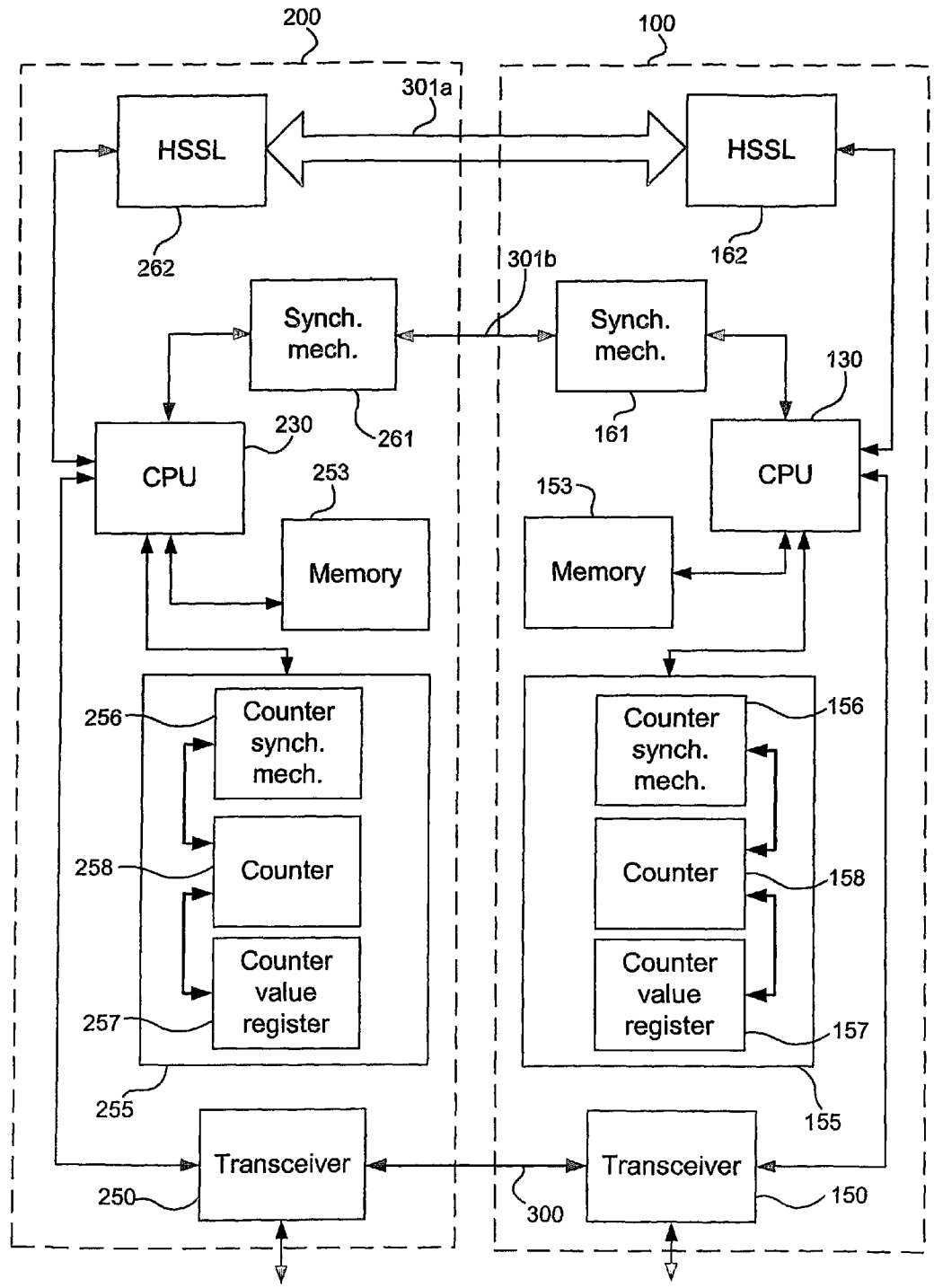
FIG. 3 is a more detailed block diagram of the access means of FIGS. 2a and 2b.

FIG. 3 illustrates a more detailed block diagram of the mobile telephone 1 and components of the two RATs 100, 200. The WCDMA physical layer 110 comprises a transceiver 150 for transmitting and receiving signals according to WCDMA technology when connected to the antenna 10 via the switch 30. A timing generator 155, for providing a time reference generating means, is adapted to generate a time reference in response to a time event in the time format of the WCDMA RAT. The timing generator 155 may be implemented as an integrated circuit of the ASIC. The timing generator 155 comprises a counter synchronize mechanism 156, which is adapted to generate a synchronization signal, common time event (CTE), which will synchronize a counter 158 of the WCDMA RAT, as will be described below. When the CTE is generated by the counter synchronize mechanism 156 the timing generator 155 will store counter values specific to the WCDMA RAT in a counter value register 157. The register 157 is readable from software executed in a CPU 130, which is specific to the WCDMA RAT 100. A synchronize mechanism 161, e.g. implemented by software instructions run on the CPU 130 or a separate processor (not shown), is adapted to generate a real time event shared between the RATs 100, 200, which indicates that an activation request to initiate measurements has been issued. This function will generate maskable interrupts in both RATs, which will synchronize the measurement initiation and activate the scheduling of the measurements. A high speed serial link (HSSL) interface 162 for communicating data between the WCDMA RAT 100 and the GSM RAT 200 is connected to the CPU 130. Parameters for a measurement gap schedule (MGS) defining the time schedule will be transmitted via the HSSL 162 over a connection 301*a*, which may be implemented as a serial connection. A memory 153 is connected to the CPU 130, and may be provided as a combined random access memory (RAM) and read only memory (ROM) integrated on the ASIC. The memory 153 may comprise software code portions for providing computer readable instructions for carrying out software implemented features of the invention when run by the mobile telephone 1. The CPU 130 may serve as a means for carrying out said instructions.

The GSM physical layer 210 comprises transceiver circuitry 250 for exchanging data with the antenna 10 when the switch 30 is in a second position. Similar to the WCDMA RAT 100, the GSM RAT 200 comprises a timing generator 255, for providing a time reference generating means, according to the same principles as the WCDMA timing generator 155. The timing generator 255 comprises a counter synchronize mechanism 256, a counter value register 257, and a counter 258. The counter synchronize mechanism 256 is connected to the counter synchronize mechanism 156 of the WCDMA RAT. A CPU 230, which is specific to the GSM RAT is connected to the timing generator 255 and the transceiver circuitry 250. The transceiver circuitry is adapted to provide communication according to GSM RAT. A synchronize mechanism 261 is adapted to provide synchronization for the measurement activation and may be implemented by computer readable software instructions executable by the CPU 230 or a separate processor. The synchronize mechanisms 161, 261 of the respective RAT 100, 200 may exchange data, which is indicated by a connection 301b. A HSSL interface 262 connected to the GSM CPU 230 is adapted to exchange data with the HSSL interface 162 of the WCDMA RAT 100 over the connection 301a. A memory 253 is connected to the CPU 230, and may be provided as a combined random access memory (RAM) and read only memory (ROM). The memory 253 may comprise software code portions for providing computer readable instructions for carrying out software implemented features of the invention when run by the mobile telephone 1. The CPU 230 may serve as a means for carrying out said instructions.

Each RAT 100, 200 is in operation required to provide cell measurements on its respective communication network 17, 20. The measurement requirements of the WCDMA RAT 100 when it is active may be measurements on neighboring cells, inter-frequency measurement, received signal code power, received signal code power after radio link combination, SIR (Signal-to-Interference Ratio), RSSI (Received Signal Strength Indicator), etc. Similarly, there are requirements that the GSM RAT 200 in operation should provide cell measurements, although it is the passive slave RAT. Such measurements comprise e.g. RSSI for a number of different neighboring cells, identification measurement, and reconfirmation measurement. Whenever a cell having superior radio link quality is found, handover from the active to the passive network may be made.

Interrupts for GSM measurements can be provided in three different categories; interrupt during compressed mode; interrupt during measurement occasions; and interrupt during measurement DRX cycle. Here, interrupt means a temporary suspension of an ongoing process caused by an event outside that process. A number of MGS schedules, as e.g. illustrated in FIG. 4, can be run in parallel. A request to activate each schedule may be issued separately. The activation time of each schedule may be determined with regard to one and the same CTE as illustrated in FIG. 5. Alternatively, each time schedule will have an activation time that is determined with regard to a specific CTE, which is independent of the CTE connected to any other time schedule.

The MGS according to the invention is a mechanism comprising time schedule parameters for synchronizing the required WCDMA and GSM measurements when the GSM RAT is passive. The available time gaps, wherein the WCDMA RAT is not receiving/transmitting, are determined and indicated by the WCDMA RAT 100. The WCDMA RAT may be in two different RRC (Radio Resource Control) protocol statuses: Idle mode and UTRAN connected mode. In Idle mode, measurements are provided according to the discontinuous reception (DRX) cycle. The UTRAN connected mode comprises Cell_PCH, Cell_FACH, Cell_DCH and URA_PCH.

In Cell_DCH, a DPCH (Dedicated Physical Channel) is assigned to the user equipment (UE), which may be a mobile telephone 1. The UE has identified the cell level by the current Active Set, which is a procedure for updating the active set of communication parameters of the connection between the UE and the UTRAN. The dedicated transport channel, the downlink-shared transport channel and the combination thereof have also been identified.

In Cell_FACH no DPCH is assigned to the UE. In this state, the UE receives FACH (Forward Access Channel) messages in the downlink, and in the uplink it can use a common channel that can execute transmission from time to time according to access procedures of each transport channel. UTRAN is aware of the location of the UE at cell level (the cell updated by UE most recently).

In Cell_PCH, URA_PCH and Idle mode, no dedicated channel is assigned to the UE. In the downlink, the UE receives PCH messages via PICH (Paging Indication Channel) by DRX. In the uplink, the UE is not engaged in anything. UTRAN is aware of the location of the UE at UTRAN registration level (the URA (User Registration Area) assigned most recently to the UE during URA Update in Cell_FACH state).

When the WCDMA RAT is in idle state the DRX cycle will control how often and how much the GSM RAT 200 is allowed to operate. In Cell_FACH the gaps are called measurement occasions in the downlink and some of them are allocated for GSM use. In the uplink, the mobile telephone 1 may itself determine when to transmit. These gaps will never be shorter than 1 WCDMA frame and thereby clearly exceed the 14 WCDMA slot maximum gap allocated in compressed mode. It is required that the GSM system manage to measure RSSI for 16 different neighboring cells in 10 ms, which gives 652 µs for each carrier that e.g. can be split into one measure part that is 59 µs (16 GSM symbols) and a tuning part that is 566 µs.

Figure 4:
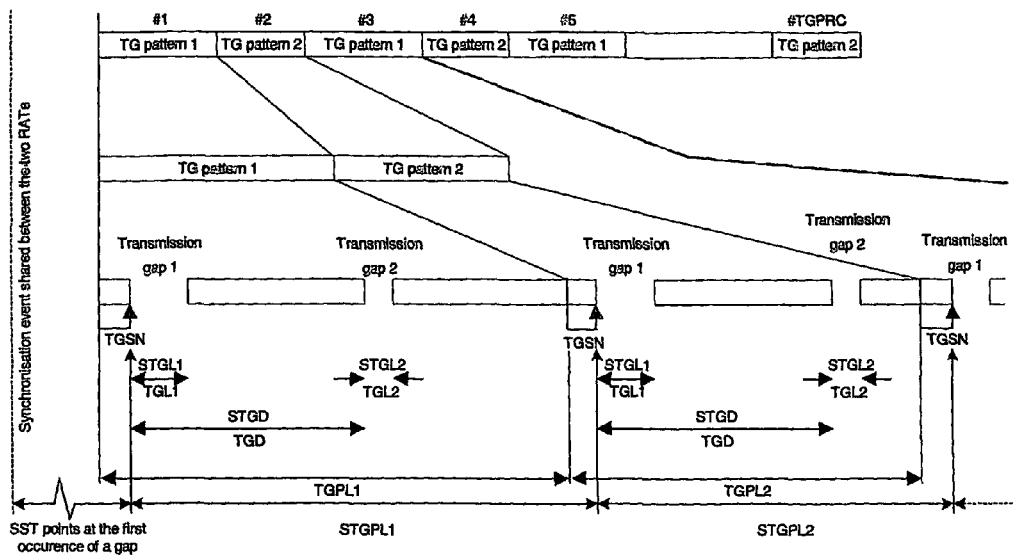
FIG. 4 is a structure diagram showing a compressed mode pattern structure.
Figure 5:
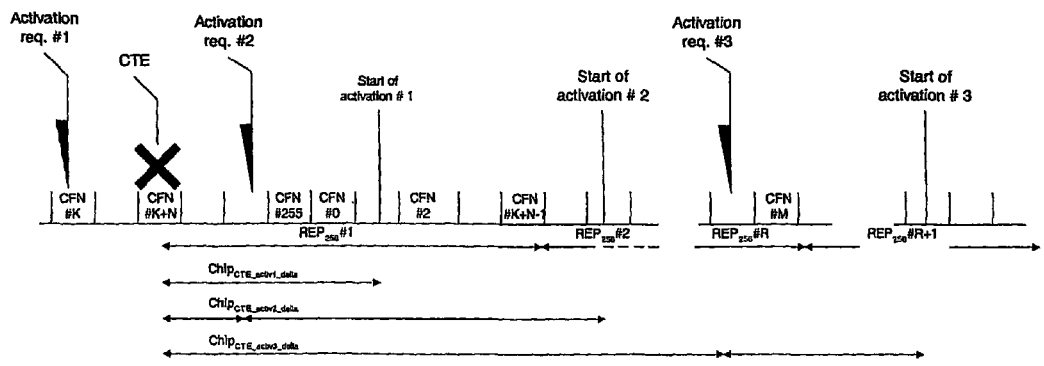
FIG. 5 is a timing diagram showing the relationship between the common time event, the activation request and the activation time of the compressed mode pattern of FIG. 4.

In FIG. 4, wherein the compressed mode pattern structure is illustrated, the following abbreviations are used:

TGSN Transmission Gap Starting Slot Number;

TGL1 Transmission Gap Length 1, duration of the first transmission gap within the TGP (Transmission Gap Pattern) expressed in slots;

TGL2 Transmission Gap Length 2, duration of the second transmission gap within the TGP (Transmission Gap Pattern) expressed in slots; if not used in a pattern TGL2=TGL1;

TGD Transmission Gap start Distance, which is the duration between the starting slots of two consecutive transmission gaps within a TGP expressed in slots. If only one TGL is used, this will not be used;

TGPL1 Transmission Gap Pattern Length 1 is the duration of transmission gap pattern length 1 expressed in number of frames;

TGPL2 Transmission Gap Pattern Length 2 is the duration of transmission gap pattern length 2, if used, expressed in number of frames;

TGPRC Transmission Gap Pattern Repetition Count is the number of transmission gap patterns within the transmission gap pattern sequence TGCFN Transmission Gap Connection Frame Number (TGCFN) is the Connection Frame Number (CFN) of the first pattern 1 within the transmission gap pattern sequence.

FIG. 4 illustrates the compressed mode pattern structure wherein reception/transmission gaps may occur. Compressed mode is based on that the radio transmission and reception of the WCDMA signals are turned off during small intervals to allow measurements on GSM neighboring cells. The transmission gaps in the compressed mode structure are referenced to the WCDMA frame and slot structure. When WCDMA RAT 100 uses compressed mode it will raise the hardest requirements on the GSM radio, as it provides the shortest gaps. The transmission gap length (TGL) can be 3, 4, 5, 7, 10, and 14 WCDMA slots where 3 and 4 are only used for RSSI measurements, 5 is used only when the GSM cell's timing is known, and 7, 10, or 14 are used for previously not identified cells. Corresponding patterns may be provided for measurement occasion and DRX cycle having gaps wherein the WCDMA RAT 100 is not receiving/transmitting.

The transmission gap can be placed in one frame. Alternatively the transmission gap crosses the frame boarder. In order to allow efficient measurements, several intervals may be placed within a transmission gap pattern (TGP).

There are three different measurement patterns for GSM with three different purposes, GSM RSSI measurements, and GSM BSIC identification and reconfirmation. Each pattern has specific requirements. Therefore, the RR block 220 needs information of the available gaps to be able to plan the future measurements. Once the gaps are known the RR block 220 may plan the measurements based on the available gaps.

The effective transmission gap may be smaller than the TGL due to two factors: the power mask for the uplink (UL) and the timing offset between the UL and downlink (DL). The WCDMA transmitter power mask surrounding the compressed mode gap introduces a margin at the start of the gap and the end of the gap. Since the start of the transmission gap will be used for radio tuning, the margin at the start will not affect the dual RAT operation but the margin at the end will disable the last portion of the transmission gap to be used for dual RAT operation. The most rigid requirement on the GSM radio tuning is the case with TGL 14 and GSM RSSI measurements. In order to get some margin it is preferred to require a radio settling time for the GSM radio. The margin has to be evaluated and tested for each particular case.

The WCDMA RAT 100 first determines the specific transmission gaps that are required for its own measurements. Any remaining transmission gap may be allocated for measurements made by the GSM RAT 200. Alternatively, the gaps that should be handed over are pre-specified, wherein the WCDMA RAT 100 has to adapt its measurements. The WCDMA RAT 100 provides to the GSM RAT 100 the position of the gaps having reference to the CTE, and a specified activation time. The basic idea is that the activation time of the transmission gap pattern is related to the latest CTE. Considering that an activation start of the pattern is related to the CFN (connection frame number), the request to activate the measurement pattern needs to be sent down from RRC block 120 to the timing generator 155 of the WCDMA physical layer 110 no more than one CFN period in advance of the activation start time. One CFN period corresponds to 25*10 ms. The request to activate the pattern may serve as the event that initiates the generation of the CTE and the MGS. Due to that the CTE could be placed at any chip position, the following parameters need to be registered in the counter value register 157 of the WCDMA RAT 100 at the time of the CTE:

The current connection frame number: $CFN_{CTE} \in \{0 \ldots 255\}$
The current slot: $Slot_{CTE} \in \{0 \ldots 14\}$
The current chip: $Chip_{CTE} \in \{0 \ldots 2559\}$ The CFN is not valid in idle mode, wherein the SFN (cell System Frame Number) has to be used to calculate the correct gaps.

A measurement activation request may cause a request for a CTE signal to be sent between the timing generators 155, 255, wherein the counter values will be stored in their counter registers 157, 257, as will be discussed below. The values of the WCDMA counter 158 and the GSM counter 258 will be stored approximately simultaneously, i.e. sufficiently simultaneous for providing a common time reference, as the RATs 100, 200 may run on asynchronous clocks. The parameters registered in the GSM RAT 200 are:

The current frame number (FN) in the GSM multiframe structure $\in \{0 \ldots 51\}$;
The position within the current frame $\in \{0 \ldots 4999\}$ [GSM quarter bit (QB)].

Alternatively, the complete representation of the frame number in the GSM stack is registered, which is in the range of [0 ... 2715647].

In total, three different GSM related compressed mode patterns, or any other pattern where appropriate, should be able to be configured to take care of the different GSM measurement requirements. This requires that the activation start of all three patterns need to refer to the same CTE. The relationship between the CTE, the measurement activation request and the activation time of the compressed mode patterns is illustrated in FIG. 5. Similar patterns may be specified for any other possible pattern, such as Idle mode and measurement occasion patterns. The configuration of activation time can be done for all patterns at once or pattern by pattern. The distance between the CTE and each activation time is denoted as $Chip_{CTE\_active\#\_delta}$, wherein #=1 ... 3 in FIG. 5. The $Chip_{CTE\_active\#\_delta}$ is based on the sum of the distance between the CTE and the CFN when the activation is requested, ($CFN_{req}$), and the remaining distance between the $CFN_{req}$ and the TGCFN.

Due to the time delay, which is caused by path drift of the received signals compared to the internal clock of the WCDMA RAT 100, between the channel timing and the counter 158 of the WCDMA RAT 100 a delay term $T_{CTE\_ALIGN}$ expressed in chips may be introduced to improve the accuracy of the time schedule, where:

$$T_{CTE\_ALIGN}=T_{channel\_delay}+T_{CTE} \text{ [chip]};$$

$$T_{CTE}=Chip_{CTE}-Slot_{CTE}*2560 \text{[chip]; and}$$

$$T_{channel\_delay}=\text{path delay} \in \{0 \ldots 38399\} \text{ [chip]}.$$

Path delay is the chip timing reference for the downlink DCH. $Chip_{CTE}$ and $Slot_{CTE}$ are the chip and slot, respectively, in which the CTE is executed.

Each of the distances from the CTE to the activation time expressed in chip may be calculated as:

$$Chip_{CTE\_req\#\_delta}=T_{CTE\_ALIGN}+(REP_{256}+\text{mod}_{CFN}(CFN_{req}-CFN_{CTE},256))*15*2560;$$

$$Chip_{req\_active\#\_delta}=\text{mod}_{CFN}(TGCFN-CFN_{req},256))*15*2560$$

$$Chip_{CTE\_active\#\_delta}=Chip_{CTE\_req\#\_delta}$$

$$+Chip_{req\_active\#\_delta}+TGSN*2560;$$

where $\text{mod}_{CFN}$ is a modulo 256 function and $REP_{256}$ is the counter 158 of the WCDMA RAT 100 that starts at 0 and is updated each time the CFN is equal to the $CFN_{CTE}$. As the first activation request is made before the CTE, the $CFN_{req}$ shall be set to $CFN_{CTE}$ for the calculation of the first distance $Chip_{CTE\_activ1\_delta}$.

The counter parameters in the WCDMA RAT 100 are expressed in WCDMA time format, whereas the counter parameters in the GSM RAT 200 are expressed in GSM time format. The WCDMA RAT 200 is the active RAT, and therefore all arithmetic operations should be made in chips to avoid summation and truncation errors. Therefore, it is necessary for the GSM RAT 200 to convert the values of the parameters determined by the WCDMA RAT 200 into QB, which is made by multiplying each parameter with the quota 325/1152.

The parameters of the MGS will define a common time schedule for providing the GSM and WCDMA measurements, and may comprise:

Schedule ID (SI) $\in \{1 \ldots 6\}$:

This parameter identifies the schedule, which will be needed in those situations when more than one schedule are active simultaneously. The value for this parameter is given by the Transmission Gap Pattern Sequence Identifier (TGPSI $\in \{1 \ldots 6\}$ in compressed mode). In other states there will only be one schedule running at the same time, i.e. one value for the SI.

Schedule Start Time (SST) $\in \{0 \ldots 2^{32}-1\}$ [chip]:

This parameter sets the activation time for a schedule in relation to the common time reference that is shared between the WCDMA RAT 100 and the GSM RAT 100 as a common time event (CTE). SST is pointing at the first gap occurrence, as is indicated in FIG. 4. The 32-bit range permits a time range up to 18 minutes and 38 seconds. This range is, however, for exemplification and has to be tested and evaluated in each particular case.

Schedule Transmission Gap Pattern Length 1 and 2 (STGPL1 and STGPL2) $\in \{0 \ldots 19660800\}$ [chip]:

STGPL1 sets the distance between the starting point of TG1 in pattern 1 and pattern 2 (or STGPL1 in the next pattern if no pattern 2 is defined). STGPL2 sets the distance between the starting point of TG1 in pattern 2 and pattern 1. The sum of these two parameters is the cyclic length of the schedule. If STGPL2 is assigned 0, there is only one pattern that is repeated. The values for these parameters are given by the TGPL in compressed mode (1 . . . 144 WCDMA frames). The distance between two measurement occasions that are assigned for GSM measurements called measurement period (80 . . . 640 ms if there are no inter-frequency neighbors and 160 . . . 1280 ms if there are inter-frequency neighbors) and inter RAT measurement periods during the DRX cycle (80 ms to 5.12 s) is calculated by WCDMA physical layer 110 in idle, Cell_PCH and URA_PCH. This gives a range from 0 to 19660800 chip (DRX 5.12 s has to serve as upper limit— twice the length can be achieved if combining STGPL1 and STGPL2).

Schedule Transmission Gap Length 1 and 2 (STGL1 and STGL2) $\in \{0 \ldots 19660800\}$ [chip]:

These parameters set the length of the gaps given by the schedule for GSM to measure in. The values for the parameters are given by the transmission gap lengths (TGL) in compressed mode (3, 4, 5, 7, 10 and 14 WCDMA slots), the length of the measurement occasions (1, 2, 4, and 8 WCDMA frames) or the inter RAT measurement periods during the DRX cycle (80 ms to 5.12 s) calculated by WCDMA physical layer 110 in Idle Cell_PCH and URA_PCH. This gives a range from 0 chips to 19660800 chips (DRX 5.12 s serves as upper limit since a complete DRX cycle will never be handed over to GSM). If STGL is assigned 0, a gap does not exist, which may be the case for STGL2.

Schedule Transmission Gap start Distance (STGD) $\in \{0 \ldots 19660800\}$ [chip]:

This parameter sets the distance between the starting points for STGL1 and STGL2. The parameter is only valid if STGL2 is greater than 0. The value for this parameter is given in compressed mode by the parameter TGD that is in the range 15 . . . 269 WCDMA slots. In measurement occasions and in the inter RAT measurement periods during the DRX cycle maximum STGPL will serve as upper limit, i.e. 19660800 chips. If there is only one gap during the pattern defined by STGPL, then STGD is set to 0.

The values of the MGS when the WCDMA RAT 100 is in Cell_DCH may be determined as:

| | |
|---|---|
| SI | TGPSI $\in \{1 \ldots 6\}$ (Transmission Gap Pattern Sequence Identifier; |
| SST | Chip$_{CTE\_active\_delta}$ + 1024 (adjustment for UL-DL time difference); |
| STGPL1 | TGPL1*2560; |
| STGPL2 | TGPL2*2560; |
| STGL1 | TGL1*2560-2048 (adjustment for receiver-transmitter timing difference and UL-DL time difference; adjustment is not necessary in e.g. downlink compressed mode); |
| STGL2 | TGL2*2560-2048 (adjustment for receiver-transmitter timing difference and UL-DL time difference; adjustment is not necessary in e.g. downlink compressed mode); and |
| STGD | TGD*2560. |

In Cell_FACH the corresponding MGS parameters may be determined as:

| | |
|---|---|
| SI | 1 [no unit] (constant value since only one schedule will be active at the same time in this state); |
| SST | Chip$_{CTE\_active\_delta}$; |
| STGPL1 | 0; |
| STGPL2 | 0; |
| STGL1 | N*2560*15; |
| STGL2 | 0; and |
| STGD | 0. |

Finally, in idle state the MGS parameters can be determined as:

| | |
|---|---|
| SI | 1 [no unit] (constant value since only one schedule will be active at the same time in this state; |
| SST | Distance from CTE to first occasion of the MGS schedule; |
| STGPL1 | According to the periods given by the DRX periods |
| STGPL2 | 0 (can be used (i.e. not zero) if several gaps need to be defined during one cycle in the schedule); |
| STGL1 | According to planning (based on the DRX periods) performed by the active RAT; |
| STGL2 | 0 (can be used (i.e. not zero) if several gaps need to be defined during one cycle in the schedule); and |
| STGD | 0 (can be used (i.e. not zero) if several gaps need to be defined during one cycle in the schedule). |

The CTE which is used to synchronize common time reference of the MGS may be provided by a hardware supported interrupt, i.e. an event caused by an external device which interrupts the ongoing process in the active RAT. The interrupt will call for the counter values to be stored in the counter value registers 157, 257.

Figure 6:
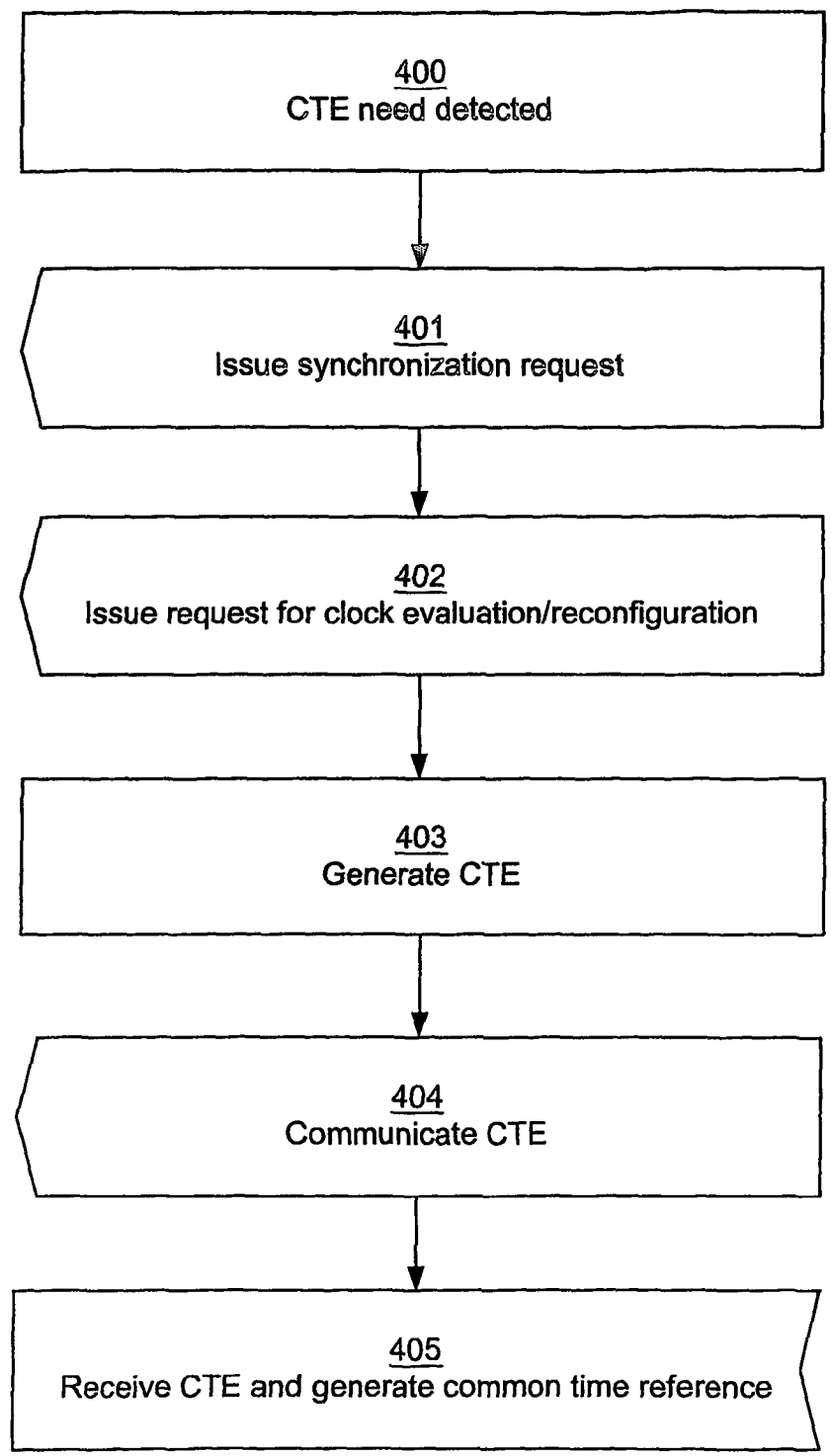
FIG. 6 is a flowchart of the steps of a method for the common time event.

FIG. 6 illustrates the steps according to one embodiment of the invention for providing the interrupt by issuing the CTE and storing the counter values in response thereto, which provides a common time reference. In a first step 400, it is detected by the controller 130 of the WCDMA physical layer 100 that there is a need for synchronization, i.e. a CTE is needed. An activation request to start a specific measurement pattern from the network may initiate the CTE procedure. Alternatively, the RRC block 120 may (on its own request, e.g. according to instructions which control the operation of said RRC block 120) initiate an activation of the synchronization. The need may be initialized by software run by the controller 130, which will transmit a request for a CTE to the synchronize mechanism 161 of the WCDMA 100. Said synchronize mechanism 161 will then in step 401 issue a synchronization request, which is transmitted to the GSM synchronize mechanism 261. If the GSM access means is run on an internal clock, in a clock evaluation/reconfiguration step 402 a request for an external clock reference will be issued. The external clock reference is necessary if it is required that the timing generator 255 of the GSM RAT 200 have to clock the counter 258 and the counter value register 257 from an external clock to achieve sufficient accuracy and not store erroneous values. An external clock (not shown), such as an voltage controlled oscillator, may serve as the external clock reference, which will clock the counter 258 and register 257 of the GSM RAT 200, and the WCDMA RAT 100 whenever appropriate. Step 402 may be omitted in alternative embodiments of the invention, wherein the external clock reference is not required. In step 403 the CTE is generated by the counter synchronize mechanism 256 of the GSM RAT 200. The CTE is e.g. generated by writing a bit in the HW interface between the GSM RAT 100 and the WCDMA RAT 100. The CTE is in step 404 communicated e.g. over line 300. In step 405 the CTE is received by the counter synchronize mechanism 156 of the WCDMA RAT 100, wherein the CTE interrupt is served in that the counter values are registered. The values are registered approximately simultaneously and stored in the respective counter value registers 157, 257, thus generating the common time reference.

In an alternative embodiment, the WCDMA timing generator 155 will generate the CTE. If it is not required that either of the RATs 100, 200, are clocked from an external clock reference, it is not necessary to involve the synchronize mechanisms 161, 261. Either of the timing generators 150, 250 may then issue the CTE.

Step 402 provides the possibility for the GSM RAT to wake up and reconfigure its internal clocks against the external clock reference whenever needed.

Figure 7:
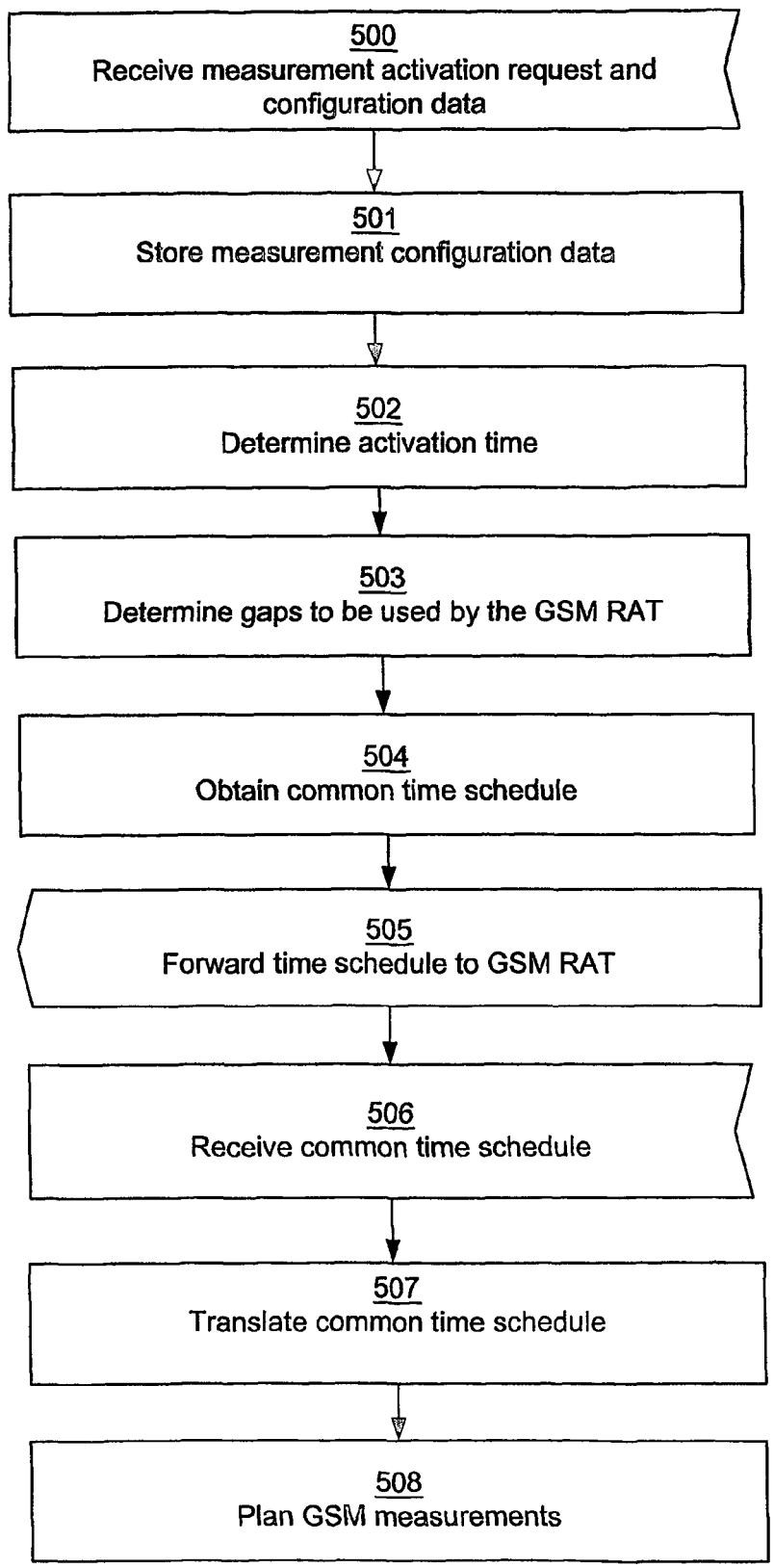
FIG. 7 is a flowchart of a first embodiment of the steps of a method for the measurement gap schedule.

FIG. 7 illustrates the steps carried out according to the invention when interrupts are provided during compressed mode or measurement occasions, i.e. when the WCDMA RAT is in Cell_DCH or Cell_FACH. The MGS is utilized, as the GSM RAT 100 has to plan measurements in advance. Then, the GSM RAT 100 is able to start the correct measurement as soon as the GSM radio is switched on and the WCDMA transceiver 150 is switched off. The synchronization procedure will e.g. start at power on if the WCDMA stack is active. Alternatively, the procedure starts if the active state of the WCDMA RAT 100 is changing or in response to a resynchronization request from the RRC block 120. The start of the procedure will establish measurement synchronization between the GSM and WCDMA RAT 100, 200 and possibly initiate CTE generation. The procedure will be ended when the WCDMA access stack enters into a passive state or into a power off state, or the state is changed.

The method of FIG. 7 is started in step 500, wherein a measurement configuration request is received by the mobile telephone 1 from the WCDMA telecommunication network 17, to which the WCDMA RAT presently is connected. The configuration request comprises any information necessary to determine the MGS, such as which gaps that may be used by the WCDMA RAT 100 and the GSM RAT 200, respectively. The measurement configuration data, i.e. compressed mode pattern or FACH measurement occasion is stored in step 501, and may be retrieved by the RRC block 120, which will plan the measurements of the WCDMA RAT 100. In step 502 the activation time of the time schedule is determined. The activation time is in Cell_DCH set by the WCDMA telecommunication network 17, whereas the activation time in Cell_FACH is obtained by the WCDMA physical layer 110, e.g. by the CPU 130, based on information received from the UTRAN. In step 503 the transmission gaps, which may be utilized by the GSM RAT 200, are determined. The gaps, which may be utilized by the GSM RAT 200, are in compressed mode given in the measurement configuration data. In Cell_FACH measurement occasions the transmission gaps are divided between the WCDMA RAT 100 and the GSM RAT 200, e.g. according to the 3GPP specification. The CPU 130 determines based on the received information, which gaps should be utilized for WCDMA RAT measurements, such as inter-frequency measurements, and which gaps should be utilized for GSM measurements. In step 504, the parameters of the MGS are obtained; The activation time and the parameters that will be handed over to the GSM RAT 100 are translated into MGS parameters. The parameters of the time schedule are determined based on the common time event CTE, which is issued in response to the activation request of the time schedule prepared in the current step. The MGS parameters including the activation time are forwarded to the GSM RAT in step 505. The GSM RAT 200 receives the MGS parameters in step 506, and translates said parameters into GSM time reference in step 507. In step 508 the planning of the GSM measurements commences, which is also the end of the procedure. The GSM measurements executed by GSM physical layer 210 may now start according to the activation time given in the MGS schedule and is e.g. controlled by the RR block 220 using said schedule.

Figure 8:
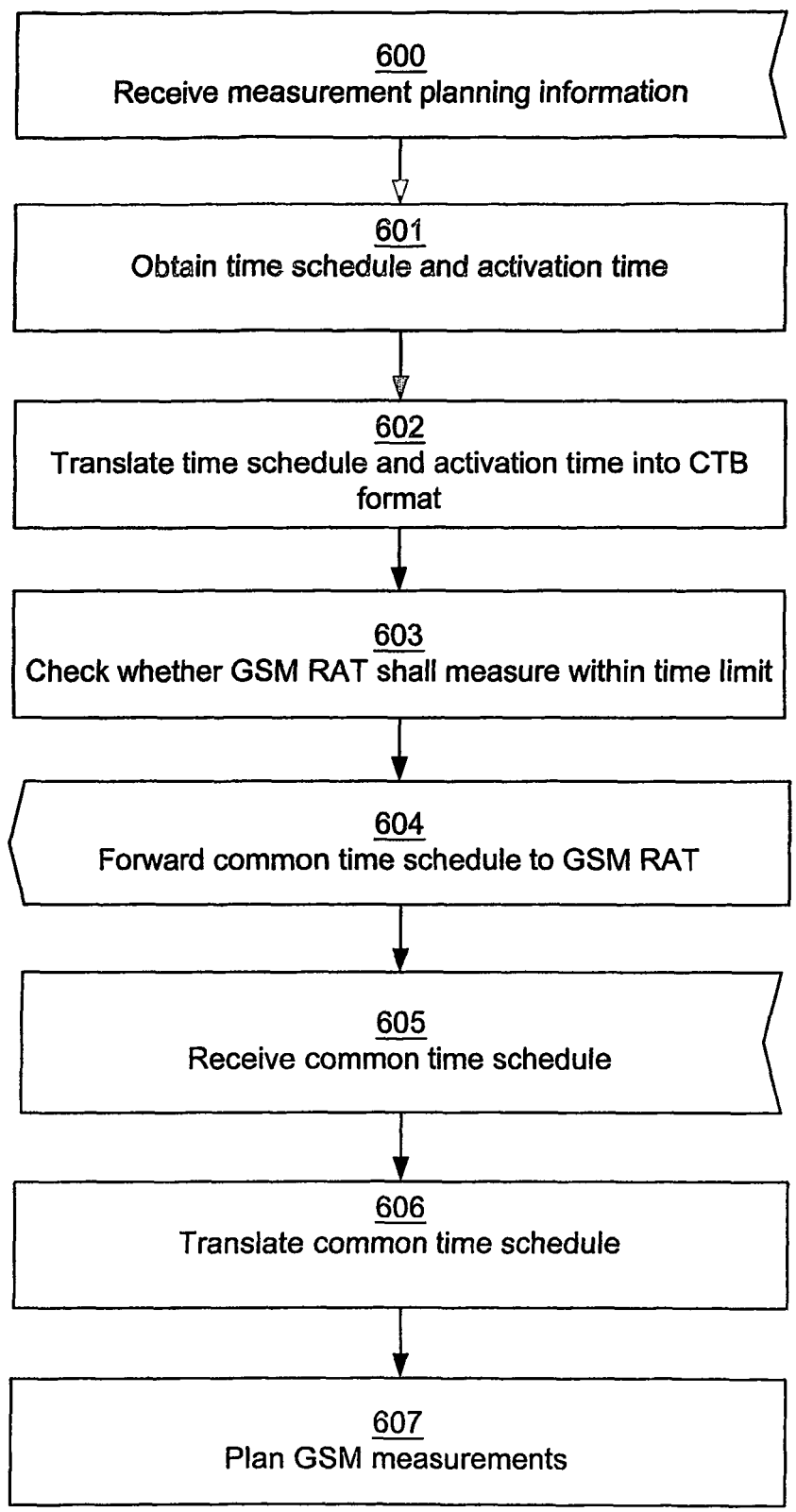
FIG. 8 is a flowchart of a second embodiment of the steps of the method for the measurement gap schedule.

FIG. 8 illustrates an alternative embodiment of the steps carried out according to the method of the invention when interrupts are provided during DRX measurement cycle, i.e. when the WCDMA RAT is in idle, in Cell_PCH, or URA_PCH state. The procedure is started at power on of the mobile telephone 1 if the WCDMA access stack is active, if any WCDMA active state is changing, or if a resynchronization is requested. The WCDMA physical layer 110 may initiate the synchronization procedure for the MGS method in order to establish synchronization. In a first step 600, the RRC block 120 receives information from the WCDMA network 17 to be able to plan the measurements, such as DRX cycle length and any setup/reconfiguration message. In step 601 the WCDMA physical layer 110 plans for the DRX measurement cycle, i.e. determines which gaps should be utilized for WCDMA RAT and GSM RAT measurements, respectively. A requested activation time is also determined. In step 602 the parameters determined in step 601 are translated into MGS format having reference to a specific CTE. Inter RAT measurement rules, which are known to the WCDMA RAT 100 and which were taken into account when the MGS schedule was obtained, determine when GSM measurements are to commence. In step 603 the RRC block 120 checks whether the GSM RAT 200 shall measure within a predetermined time limit. If so, the MGS schedule is forwarded to the GSM RAT in step 604. Otherwise, the procedure waits in step 603 until a GSM measurement is to commence or the procedure is ended. Alternatively, the time schedule is directly handed over to the GSM RAT 200 as soon as it is obtained. The GSM RAT 200 receives the MGS parameters including a start time for the schedule in step 605. The MGS parameters are translated into GSM reference time in step 606. The RR block 220 may start planning for the GSM measurements in step 607, wherein the WCDMA RAT 100 and the GSM RAT 100 have knowledge of when to execute measurements according to the obtained MGS.

One difference for the common timing between the idle mode and Cell_DCH or Cell_FACH is that the time references for the different RATs 100, 200 are not locked to each other. This requires that the MGS has to be resynchronized continuously.

The WCDMA physical layer 110 will start the execution of the measurement patterns, i.e. compressed mode patterns, FACH measurement occasions, or DRX measurement cycle, and may handle the common radio resources, such as the switch 30 and the antenna 10, according to the MGS schedule. The GSM physical layer 210 executes its measurements according to the MGS schedule and will have control over the common radio resources during these measurements when the WCDMA transceiver 150 is temporarily inactive. Alternatively, when separate antennas 10a, 10b are provided no control over the radio resources is necessary, but simultaneous activation (transmission/reception) of the WCDMA RAT 100 and the GSM RAT 200 is avoided by means of the WCDMA and GSM physical layer 110, 210 having knowledge of the MGS schedule.

The RR block 220 will control the measurements at GSM physical layer 210 using MGS schedule. The measurements are scheduled according to the starting time given by the MGS schedule. In idle state the source of the MGS is DRX measurement. The RRC block 120 will request input information for the MGS schedule from WCDMA physical layer 110, since the WCDMA physical layer 110 is executing the planning of the activities during the cycle to be able to control the measurements.

The GSM radio transceiver 250 may be active immediately when the WCDMA radio transceiver 150 has been switched off. To ensure that the WCDMA transceiver has been completely switched off before the GSM transceiver 250 is activated a first time margin may be added after the WCDMA transceiver 150 is switched off. Similarly, a second time margin may be added when the GSM transceiver 250 is switched off and the WCDMA transceiver is activated. During the first time margin, the switch 30 may be controlled to switch from the first to the second position. The WCDMA CPU 130 may e.g. control the switching of the switch 30 from the first position, wherein the WCDMA transceiver 150 is connected to the antenna 10, to the second position when the WCDMA transceiver 150 is properly switched off. Similarly, the GSM CPU 230 may control the switch 30 to switch from the second to the first position when the GSM transceiver 250 is properly switched off.

The WCDMA physical layer 110 is adapted to detect a number of situations wherein the GSM RAT measurements are to be interrupted, which creates a MGS exception. Such exceptions are e.g. during altering state (leaving Cell_FACH), RACH (Random Access CHannel) procedure, BCH (Broadcast CHannel) reading due to paging, SFN (cell System Frame Number), (BCH) reading on neighbors in Cell_FACH and Cell_DCH, compressed mode patterns ends (TG-PRC parameter in compressed mode, colliding compressed mode patterns, and state transition, i.e. transition between idle, Cell_PCH, and Cell_FACH). The exceptions are preferably detected by the WCDMA RAT 100, as it is the active RAT requiring the exceptions. In all exceptions, the GSM RAT 100 is notified by an exception interrupt signal, which indicates that GSM measurements should be discontinued, wherein all ongoing measurements are stopped. As soon as the exception is taken care of by the WCDMA RAT 100, the GSM RAT 200 may be informed that GSM measurements may be resumed. In such a case, stored MGS parameters may be utilized for the resumed measurements. The stored parameters may have to be evaluated to secure their validity. The time range for the MGS may have expired, wherein a resynchronization has to be provided. Alternatively, a resynchronization of the RATs 100, 200 is always executed after an exception has been taken care of.

The MGS procedure according to any of the above embodiments is completely stopped when the WCDMA access stack e.g. enters into a passive state, or is switched off.

The present invention has been described above with reference to a mobile telephone. However, the invention may be provided in any portable radio communication equipment, such as a mobile radio terminal, a pager, or a communicator, i.e. an electronic organizer, smartphone or the like having dual RAT capabilities.

The present invention has been described above with reference to specific embodiments. However, other embodiments than the above described are equally possible within the scope of the invention. Different method steps than those described above, performing the method by hardware or software, may be provided within the scope of the invention. The different features and steps of the invention may be combined in other combinations than those described. The invention is only limited by the appended patent claims

The invention claimed is:

1. A method for internally synchronizing cell measurements in a mobile communication apparatus having a first active radio access means adapted to communicate according to a first radio access technology (RAT) and a second passive radio access means adapted to communicate according to a second RAT, comprising the steps of:
the mobile communication apparatus performs the following steps:
generating a common time event (CTE) upon issuance of a request to initiate the cell measurements;
generating a time reference common to the first and the second radio access means by registering counter values from a first and second counter provided in the first and the second radio access means respectively in response to the CTE;
obtaining, by said first radio access means, a measurement gap schedule including a time schedule in a time format of said first radio access means, said time schedule indicating a time gap during which the second radio access means is allowed to be active and not interrupt communications of the first radio access means, said measurement gap schedule includes an activation time of the time schedule where the activation time is determined in the time format of said first radio access means and the activation time is determined based on a time distance from the CTE;
forwarding said measurement gap schedule to said second radio access means; and
translating said measurement gap schedule by said second radio access means using the time reference of the registered counter value in the second counter to determine the activation time in a time format of said second access means.

2. The method according to claim 1, wherein the CTE is a hardware supported interrupt.

3. The method according to claim 1, wherein a current connection frame number, current slot, and current chip are registered by the first radio access means in response to the CTE.

4. The method according to claim 1, wherein a current frame number in a GSM multiframe structure, and a position within the frame is registered by the second radio access means in response to the CTE.

5. The method according to claim 1, wherein the time schedule is obtained based on information received from a first communication network to which the first radio access means is coupled.

6. The method according to claim 5, wherein the received information comprises configuration data specifying gaps, in which the second radio access means is allowed to be active.

7. The method according to claim 5, wherein the received information comprises setup or reconfiguration information, and the first radio access means obtains the gaps based on stored and received data.

8. The method according to claim 1, wherein the duration of the time gap, and the distance between the common time reference and the time gap, are given in the time schedule.

9. The method according to claim 1, wherein several time gaps are determined in the time schedule, and the distance between each of the time gaps is specified in the time schedule.

10. The method according to claim 1, wherein a delay between channel timing and the counter of the first radio access means is taken into account when determining the activation time of the time schedule.

11. The method according to claim 1, wherein the time schedule is utilized by the second radio access means to provide cell measurements.

12. A mobile communication apparatus for internally synchronizing cell measurements, comprising:
a first active radio access means comprising a first transceiver means for communicating with a first communication network the first transceiver means being adapted to communicate according to a first radio access technology;
a second passive radio access means comprising a second transceiver means for communicating with a second communication network, the second transceiver means being adapted to communicate according to a second radio access technology;
a timing generator means for generating a common time event (CTE) upon issuance of a request to initiate the cell measurements;
a time reference generating means for generating a time reference common to the first radio access means and the second radio access means by registering counter values from a first and second counter means provided in the first and the second radio access means respectively in response to the CTE;
a time schedule generating means in the first radio access means for obtaining a measurement gap schedule including a time schedule in a time format of the first radio access means, the time schedule indicating at least one time gap during which the second radio access means is allowed to be active and not interrupt communications of the first radio access means, said measurement gap schedule includes an activation time of the time schedule where the activation time is determined in the time format of said first radio access means and the activation time is determined based on a time distance from the CTE;
means for forwarding the measurement gap schedule to the second radio access means; and
means on the second access means for translating the measurement gap schedule using the time reference of the registered counter value in the second counter means to determine the activation time in a time format of the second radio access means.

13. The mobile communication apparatus according to claim 12, wherein the time reference generating means comprises a first and second counter synchronize mechanism provided in the first and second radio access means, respectively;
one of the counter synchronize mechanisms being adapted to generate an interrupt;
wherein the interrupt is the CTE;
the other counter synchronize mechanism adapted to receive the interrupt.

14. The mobile communication apparatus according to claim 13, wherein either or both of the counter synchronize mechanisms are adapted to write a bit onto a connection to the other, the bit being the interrupt.

15. The mobile communication apparatus according to claim 14, wherein the time reference generating means comprises first and second counter means and first and second counter value register means provided in the first and second radio access means, respectively.

16. The mobile communication apparatus according to claim 15, wherein the counter of the first radio access means, in operation, is adapted to generate current connection frame number, current slot, and current chip, which the time reference generating means is adapted to store in the first counter value register means in response to the CTE.

17. The mobile communication apparatus according to claim 15, wherein the counter of the second radio access means is adapted to generate a current frame number in GSM multiframe structure, and a position within the frame, which the time reference generating means is adapted to store in the second counter value register means in response to the CTE.

18. The mobile communication apparatus according to claim 12, wherein the time schedule generating means is adapted to obtain the time schedule based on stored information and data received from the first communication network during operation.

19. The mobile communication apparatus according to claim 12, wherein the time schedule generating means is adapted to incorporate into the time schedule parameters that identify the duration of the time gap, and the distance between the common time reference and the at least one time gap.

20. The mobile communication apparatus according to claim 12, wherein the time schedule generating means is adapted to incorporate into the time schedule a plurality of time gaps, and to specify the distance between each of the plurality of time gaps in the time schedule.

21. The mobile communication apparatus according to claim 12, wherein the second radio access means is adapted to provide cell measurements during the time gaps given in the time schedule, and wherein the first access radio means is adapted to be passive.

22. The mobile communication apparatus according to claim 12, wherein the first radio access technology is WCDMA (Wideband Code Division Multiple Access).

23. The mobile communication apparatus according to claim 12, wherein the second access technology is GSM (Global System for Mobile communication).

24. The mobile communication apparatus according to claim 12, wherein the first and second radio access means have at least one common radio resource.

25. The mobile communication apparatus according to claim 24, wherein the common radio resource is an antenna.

26. The mobile communication apparatus according to claim 12, further comprising:
a mobile terminal operable within the first radio access technology and second radio access technology;
the mobile terminal having digital computer capabilities;
a computer program product embodied on a computer readable memory of the mobile terminal having software code portions for generating a time reference common to the first and the second radio access means;

obtaining at least one time schedule, the time schedule indicating the time gap during which the second radio access means is allowed to be active; and determining the activation time of the time schedule based on the common time reference.

27. The arrangement according claim 12, adapted for use in a wireless communication apparatus.

28. The mobile communication apparatus according to claim 27, wherein the mobile communication apparatus is one from the group consisting of a mobile radio terminal, a mobile telephone, a pager and a communicator.

29. The method according to claim 1, wherein the request to initiate the cell measurement is issued when the mobile communication apparatus experiences a certain link quality with base stations associated with the first radio access technology and the second radio access technology.

30. The method according to claim 1, wherein the request to initiate the cell measurement is a measurement configuration request received from a base station associated with the first radio access technology.

* * * * *

UNITED STATES PATENT AND TRADEMARK OFFICE
CERTIFICATE OF CORRECTION

| | |
|---|---|
| PATENT NO. | : 7,917,113 B2 |
| APPLICATION NO. | : 10/553082 |
| DATED | : March 29, 2011 |
| INVENTOR(S) | : Palenius et al. |

It is certified that error appears in the above-identified patent and that said Letters Patent is hereby corrected as shown below:

In Column 10, Line 47, delete "256))" and insert -- 256) --, therefor.

In Column 19, Line 9, in Claim 27, delete "The arrangement according claim" and insert -- The mobile communication apparatus according to --, therefor.

Signed and Sealed this
Twenty-seventh Day of September, 2011

David J. Kappos
*Director of the United States Patent and Trademark Office*